July 7, 1953 B. CLAYTON Re. 23,680

PURIFICATION OF GLYCERIDE OILS

Original Filed April 21, 1943

Inventor

*Benjamin Clayton*

By Harris, Kiech, Foster & Harris

Attorneys

Reissued July 7, 1953

Re. 23,680

UNITED STATES PATENT OFFICE 23,680

PURIFICATION OF GLYCERIDE OILS

Benjamin Clayton, Pasadena, Calif., assignor, by mesne assignments, to Benjamin Clayton, doing business as Refining, Unincorporated Original No. 2,412,251, dated December 10, 1946, Serial No. 483,953, April 21, 1943. Application for reissue October 7, 1952, Serial No. 313,620

23 Claims. (Cl. 260—425)

Figure 1:
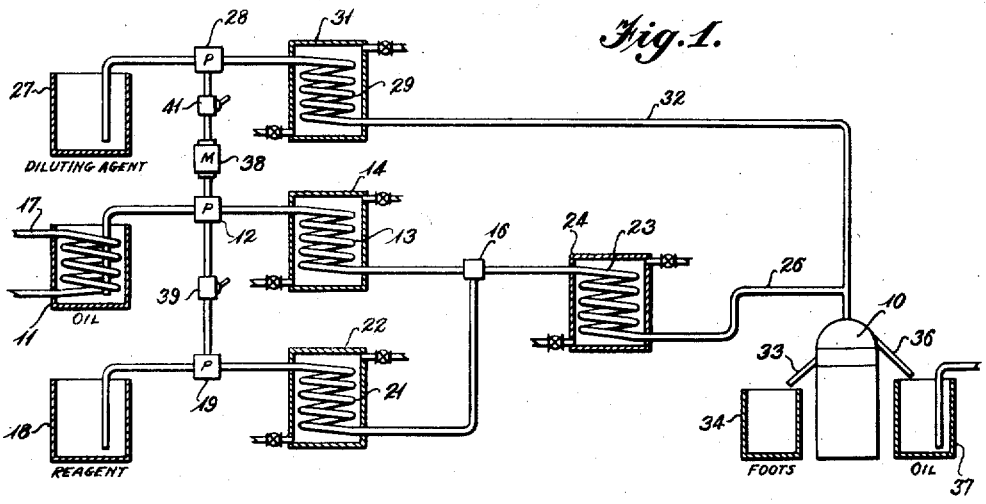

Matter enclosed in heavy brackets [ ] appears in the original patent but forms no part of this reissue specification; matter printed in italics indicates the additions made by reissue.

This invention relates to the purification of oil and more particularly to a process for the removal of small amounts of impurities from glyceride oils, such as animal and vegetable oils, which oils are substantially free of fatty acids and gums.

It is frequently necessary to purify glyceride oils which are low in free fatty acid content, for example, oils having free fatty acid content below .25% and which are also low in materials commonly referred to as gums, namely, phosphatides, proteinaceous materials, resins, etc. The impurities required to be removed may be coloring matter or materials which impart to the oil a deleterious taste or odor. Or it may be desired to treat an oil which has naturally occurring impurities in very limited quantities.

An example of a glyceride oil which requires color removal is a cottonseed oil which has been refined with non-saponifying alkalies such as soda ash or has been refined with insufficient caustic alkali to lower the color of the oil to the required extent. The employment of non-caustic alkali adequately removes the free fatty acid content and also removes substantially all of the gums but the resulting oil is usually of darker color than that desired. The losses resulting from the refining of vegetable oils in a continuous process using soda ash or other non-saponifying alkalies are much less than in processes in which sufficient caustic alkali is employed in the first instance to not only remove fatty acids and gums from the oil but to produce a low colored oil. It is, however, necessary to re-refine the oil using a caustic alkali or similar color reducing material to produce a low colored oil.

Cottonseed oils vary widely in their characteristics from year to year and in accordance with production areas. It has been found possible to re-refine certain types of cottonseed oil, after they have been refined by a continuous soda ash process, by using small amounts of relatively dilute caustic alkali in a continuous process to obtain a properly decolorized oil with exceedingly small losses. However, it has also been found that many and perhaps most cottonseed oils, are not capable of being re-refined with small amounts of relatively dilute caustic alkali. Such dilute alkali not only fails to reduce the color of the oil but produces difficultly separable emulsions which are not properly separated in a continuous centrifugal separator.

In accordance with the present invention, it has been found that emulsion difficulties may be obviated and an adequate reduction of the color of the oil can be obtained by employing small amounts of relatively concentrated caustic soda, for example, concentrations between 20 and 50° Baumé. The use of such concentrated solutions, however, has heretofore been found impossible in continuous refining as strong caustic solutions cause the small amount of soap formed during the re-refining operation to be salted out of the caustic solution and to separate with the neutral oil in the centrifugal separator. By employing a strong caustic solution for color removal and then diluting the caustic immediately before or during separation of the oil from the decolorizing reagent, soap and precipitated impurities, it has been found that the beneficial effects of the strong caustic solution can be obtained while separation difficulties are obviated. Difficulties similar to those described above are encountered with various other oils which are low in free fatty acid and gum content and the employment of strong caustic solutions to precipitate or remove impurities from the oil, followed by dilution of the caustic solution during or just prior to separation, has also been found applicable in the treatment of such oils.

It is therefore an object of the present invention to provide an improved process for removing impurities from glyceride oils which are low in free fatty acid and gum content.

Another object of the invention is to provide an improved process of removing small amounts of impurities from glyceride oils having low free fatty acid and gum content in which process strong caustic alkali solutions are employed but are diluted prior to the separation operation.

Another object of the invention is to provide a process of re-refining glyceride oils containing only a small amount of impurities in which refining losses are reduced.

A further object of the invention is to provide an improved process of effectively removing impurities from glyceride oils which contain small amounts only of such impurities so as to overcome separation difficulties.

A still further object of the invention is to provide an improved process of reducing the color of refined glyceride oils by chemical treatment and with substantially no refining losses.

Figure 2:
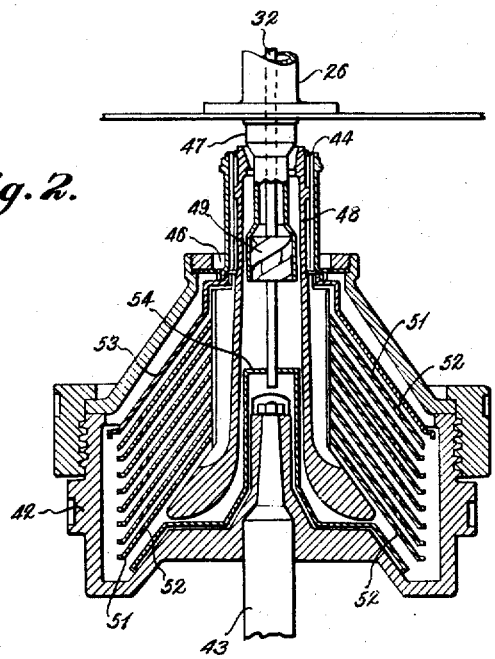

Other objects and advantages of the invention will appear in the following description of preferred embodiments thereof given with reference to the attached drawing in which:

Fig. 1 is a schematic diagram of an apparatus suitable for carrying out the present invention, and Fig. 2 is a somewhat diagrammatic vertical sectional view through a centrifugal separator bowl, particularly applicable for use in the present invention.

Referring to Fig. 1, the process of the present invention is preferably carried out in apparatus in which an oil is treated with a reagent for precipitating the impurities and then delivered into a centrifugal separator 10 for separation of the precipitated material or foots from the oil. The oil to be treated may be withdrawn from a source of supply shown as a tank 11 by means of a proportioning pump 12 and delivered through a heating coil 13 of a heat exchange device 14 to a mixer 16. The tank 11 may be provided with a heating coil 17 or similar heating means for maintaining the oil in the tank 11 in fluid condition in case oils or fats solid at ordinary temperatures are being treated. The reagent for precipitating impurities may be withdrawn from a tank 18 and delivered by a proportioning pump 19 through a heating coil 21 of the heat exchanger 22 to the mixer 16. The mixer 16 may be of any suitable type such as a closed mechanical agitator but is preferably of the flow mixer type disclosed in the patent to Thurman 2,142,062 granted December 27, 1938.

A thorough mixture of the reagent and oil produced in the mixer 16 is then passed through a heating coil 23 of the heat exchanger 24 and delivered into the centrifugal 10 through the pipe 26. A diluting agent for the reagent in the mixture entering the centrifugal 10 may be withdrawn from tank 27 by means of a proportioning pump 28 and delivered through the coil 29 of the heat exchanger 31 and a pipe 32 so as to be admixed with the oil reagent mixture at the entrance of the centrifugal separator 10. The diluting agent which, in most instances, is water, dilutes the mixture so that soap formed in the reaction is retained in solution in the aqueous phase or heavy effluent and discharged through the spout 33 into a receiver 34 while the purified oil is discharged through a spout 36 into a receiver 37. The proportioning pumps 12, 19 and 28 may be driven by a variable speed electric motor 38 connected directly to the oil pump 12 and through variable speed devices 39 and 41 between the motor 38 and the proportioning pumps 19 and 28, respectively. Other types of proportioning apparatus may, however, be employed, for example, that shown in patent to Thurman above referred.

Instead of delivering the diluting agent into the oil-reagent mixture as the mixture enters the centrifugal separator, it is preferred to admit the diluting agent with the heavy effluent in the centrifugal after separation has been largely accomplished. This avoids substantially all contact between the oil and a dilute reagent so that emulsion difficulties are entirely overcome. A suitable type of centrifugal separator for accomplishing this operation is shown in Fig. 2. Such a separator may include a bowl 42 mounted upon a shaft 43 for rotation at high speed and may also include an outlet port 44 for the light effluent and an outlet 46 for the heavy effluent. The oil and reagent mixture containing precipitated impurities, as well as a small amount of soap, is delivered into the centrifugal through a stationary pipe 47 and then delivered into a tubular inner bowl member 48 by means of a distributor 49. The inner bowl member 48 divides the separation zone of the bowl from the inlet portion thereof and directs the incoming mixture downwardly and outwardly into the lower portion of the bowl. The separation zone of the bowl may be provided with a plurality of conical baffle members 51 which are apertured at 52 adjacent the neutral zone of separation. Material to be separated flows upwardly through the apertures 52, the light effluent comprising the oil flowing inwardly in the bowl and being discharged through the outlet port 44. The heavier materials comprising the aqueous phase containing the precipitated impurities and soap flow outwardly and then upwardly along the periphery of the bowl and are discharged through the port 46, the imperforate baffle 53 preventing admixture of the heavy effluent with the oil being discharged through the port 44.

Water or other diluting agent is introduced into the bowl by the pipe 32 which extends downwardly through the pipe 26 so as to terminate within a circular baffle member 54 which maintains the water separate from the incoming oil-reagent mixture and directs the diluting agent to the lower periphery of the bowl. The diluting agent admixes with the heavy effluent to dilute the same and cause any soap present in the mixture to be retained in solution or dissolved in the heavy effluent so as to be discharged therewith through the port 46.

In treatment of oils such as those contemplated in the present invention, namely, oils which are low in free fatty acid and gum content, the heavy effluent is predominantly an aqueous solution of the reagent even before dilution with the diluting agent. This aqueous solution contains excess reagent and small amounts of soap. Attempts to employ dilute precipitating agents result not only in ineffective removal of impurities from the oil but in the formation of tight emulsions which are not effectively separated in the centrifugal even though the mixture is separated at relatively high temperatures. In such cases, substantial amounts of reagent are carried out with the purified oil discharged from the port 44, requiring extensive washing or other treatment to remove the included reagent from the oil. More importantly, a very substantial amount of the oil is entrained with and discharged with the heavy effluent through the port 46, resulting in high refining losses. In many instances also the impurities are not adequately removed from the oil.

By employing strong precipitating reagents such as caustic soda solutions ranging between 20 to 50° Baumé, such emulsions are not encountered and in accordance with the present invention refining losses are reduced to a very low figure. However, small amounts of soap are formed by reaction of the caustic alkali with residual free fatty acids in the oil or by reaction with the oil itself and this soap is grained out of the heavy effluent in the centrifugal. Three layers of strata tend to be built up in the centrifugal bowl: an inner oil layer, an intermediate soap layer, and an outer aqueous layer. These layers are not definitely defined and any attempt to adjust the centrifugal to separate the soap with the aqueous layer causes high refining losses whereas failure to separate the soap with the aqueous layer produces an impure oil requiring extensive further purification treatment.

This difficulty can be overcome by diluting the mixture just prior to centrifugal separation, for example, by introducing a diluting agent such as water into the mixture entering the centrifugal but a slight amount of difficultly separable emulsion may be formed due to contact between the oil and diluted reagent and it is found that the precipitation of impurities such as coloring matter is not as effective as is the case when separation is substantially complete prior to dilution of the mixture. In the centrifugal separator shown in Fig. 2, diluting of the heavy effluent after complete or substantially complete separation thereof from the oil causes the soap layer above referred to, to remain in solution or go into solution in the aqueous layer so that it separates cleanly from the oil.

Reaction of color impurities, with a precipitating reagent such as caustic soda usually takes place more rapidly and more completely at low temperatures, for example, temperatures between 70 and 100° F. The oil in the tank 11 of Fig. 1 is therefore preferably maintained between these temperatures except in cases where the oil is delivered to the tank from a prior refining or similar process at a high temperature or the oil or fat requires heating to a higher temperature to render the same fluid. The heat exchanger 14 is therefore not employed when the oil is at the correct temperature for admixture with the precipitating reagent but may be employed to either cool or heat the oil in order to bring it to the desired temperature for mixing with the reagent. Similarly the heat exchanger 22 may be employed to either heat or cool the reagent to a desired mixing temperature. In general the temperature of the reagent will usually be adjusted to substantially that of the oil entering the mixer 16.

Properly proportioned amounts of the oil and reagent are thus delivered to the mixer 16 by means of proportioning pumps 12 and 19 and passed through the reaction coil 23 in the heat exchanger 24. Since the temperature giving most effective separation is usually considerably above the most efficient reaction temperature, any desired heating medium may be circulated through the heat exchanger 24 to raise the temperature of the mixture to that required for effective centrifugal separation. These temperatures will usually range between 120 and 180° F., depending upon the type of oil being treated, the impurities desired to be removed and the melting temperature of the oil. The oils being treated will ordinarily contain not more than approximately .25% free fatty acid and only slight amounts or traces of gums. The preferred reagent is a concentrated aqueous solution of caustic soda, for example, solutions ranging from 20° Baumé up to 50° Baumé. A considerable excess of caustic soda over that required to neutralize any free fatty acids present is usually employed. Thus the amounts of caustic solution will usually range between approximately ½ and 4%, the quantity most generally used being in the neighborhood of 2%.

As stated above, the temperature of mixing is preferably between 70 and 100° F. although for removing certain types of impurities this temperature may be as high as 130 to 140° F. The temperature of separation will, however, usually range between 120 and 180° F., although this temperature may at times be as low as 100° F.

Water is the preferred diluting agent and the amount of water will ordinarily range between approximately 2.5 and ten times the amount of reagent employed. In general, it has been found desirable to reduce the concentration of the excess reagent in the centrifugal to at least 8° Baumé although in some instances higher concentrations up to 10 or 12° Baumé have been found operable and lower concentrations ranging down to approximately 4° Baumé may sometimes be found advantageous in the centrifugal separator. In any event, the amount of water or other diluting agent employed in the centrifugal separator should be sufficient to cause the soap to separate in solution or in dispersed form in the aqueous phase. Also the temperature of the diluting agent should in general, be at least as high as the temperature of separation and preferably is somewhat higher. Thus the temperature of the diluting agent will range between approximately 100 and 200° F.

The material discharged from the centrifuge is in most cases largely water containing excess caustic soda and a small amount of soap. In general the amount of soap will not exceed 2% and is usually between .2% and 1% of the material discharged. By employing strong caustic alkali solutions and diluting the same just prior to or during separation, the losses rarely exceed .2% and usually do not exceed .15% whereas the losses when employing equivalent amounts of dilute caustic soda in the first instance may run as high as 2% or higher. It has been found that even increasing the amount of caustic solution does not measurably increase the losses in the process provided sufficient diluting agent is introduced to carry the concentration of the reagent in the centrifugal below that at which soap tends to separate with the oil.

While the present process is particularly adaptable to the re-refining of cottonseed oil previously refined by a continuous soda ash process, such as oil refined by the processes disclosed in my Patents No. 2,249,701, and No. 2,249,702, granted July 15, 1941, certain vegetable or animal oils in the form they are recovered from the raw material are naturally low in free fatty acids and gums and the present process may be advantageously employed for removal of small amounts of impurities therefrom. Also substantially completely refined oils intended for edible purposes are frequently processed under conditions which somewhat increase their free fatty acid content and impart deleterious tastes or odors thereto. Such oils or fats are advantageously subjected to the process of the present invention for removal of the small amounts of impurities contained therein. Furthermore, certain light colored oils, such as corn oil, requiring no treatment for color reduction after refining in continuous soda ash processes, are benefited by treatment in accordance with the present invention as in some instances such oils are extremely difficult to wash without excessive refining losses. It has been found that treatment in accordance with the present invention in conjunction with a subsequent water washing operation produces much lower losses than direct washing of the oil from the primary refining operation. Thus the present process conditions the oil for a washing operation with low losses.

While caustic soda is a preferred reagent in the present invention, it is also possible to employ sodium peroxide which liberates caustic soda while admixed with water and should be used in sufficient amounts to produce the concentration of caustic soda contemplated in the present invention. The sodium peroxide additionally liberates oxygen which materially assists in removing coloring matter and other impurities from the oil. An advantageous operation is to employ a reagent consisting predominantly of caustic soda but containing a small amount of sodium peroxide or other oxygen liberating material. Other equivalent alkali metal compounds such as potassium compounds are also suitable.

This application is *an application for reissue of my Patent No. 2,412,251, granted December 10, 1946 on an application Serial No. 483,953 filed April 21, 1943 which application is* a continuation-in-part of my copending application Serial No. 398,489, filed June 17, 1941, which is in turn a division of Serial No. 296,685, filed September 26, 1939, now Patent No. 2,249,701, granted July 15, 1941.

While I have disclosed the preferred embodiment of my invention, it is understood that the details thereof may be varied within the scope of the following claims.

I claim:

1. The process of purifying a glyceride oil which is low in free fatty acid and gum content and contains small amounts of other impurities, which process comprises, mixing with said oil a caustic soda solution having a concentration between approximately 20 and 50° Bé., said reagent being added in sufficient amount to precipitate said impurities and prevent the formation of an emulsion in said oil and said reagent, whereby the resulting mixture will separate into an oil layer, a soap layer, and an aqueous layer containing said impurities when subjected to centrifugal separation, subjecting the resulting mixture to centrifugal separation and diluting said mixture prior to complete separation in the centrifugal to lower of the concentration of the aqueous layer to between approximately 4 and 10° Bé., whereby said soap discharges with said aqueous layer from said centrifugal.

2. The process of purifying a glyceride oil which is low in free fatty acid and gum content and contains small amounts of other impurities, which process comprises, mixing with said oil a caustic soda solution having a concentration between approximately 20 and 50° Bé., said reagent being added in sufficient amount to precipitate said impurities and prevent the formation of an emulsion of said oil and said reagent, whereby the resulting mixture will separate into an oil layer, a soap layer, and an aqueous layer containing said impurities when subjected to centrifugal separation, subjecting the resulting mixture to centrifugal separation and diluting said reagent prior to complete separation in the centrifugal so as to produce a concentration in said aqueous layer not substantially greater than 8° Bé., whereby said soap discharges with said aqueous layer from said centrifugal.

3. The process of purifying a glyceride oil which is low in free fatty acid and gum content and contains small amounts of other impurities, which process comprises, mixing with said oil a caustic alkali solution having a concentration between approximately 20 and 50° Bé. to precipitate said impurities and form a small amount of soap, whereby the resulting mixture stratifies into an oil phase, a soap phase and an aqueous phase when the same is subjected to centrifugal separation, subjecting the resulting mixture to centrifugal separation, and adding sufficient water to said aqueous phase in said centrifugal after said aqueous phase and soap have been at least partially separated from said oil to reduce the concentration of said aqueous phase to between approximately 4 and 10° Bé. whereby said soap discharges from said centrifugal with said aqueous phase.

4. The process of purifying a glyceride oil which is low in free fatty acid and gum content and contains small amounts of other impurities, which process comprises, mixing with said oil a caustic alkali solution having a concentration between approximately 20 and 50° Bé. to precipitate said impurities and form a small amount of soap, whereby the resulting mixture stratifies into an oil phase, a soap phase and an aqueous phase when the same is subjected to centrifugal separation, subjecting the resulting mixture to centrifugal separation, and adding sufficient water to said aqueous phase in said centrifugal after said aqueous phase and said soap have been at least partially separated from said oil, to reduce the concentration of said aqueous phase to at least 8° Bé. whereby said soap discharges from said centrifugal with said aqueous phase.

5. The process of purifying a glyceride oil which is low in free fatty acids and gum content, which process comprises mixing with said oil a caustic alkali solution having a concentration between approximately 20 and 50° Bé. to precipitate said impurities and to form a small amount of soap, and of sufficient concentration to stratify the mixture into an oil phase, a soap phase and an aqueous phase when the same is subjected to centrifugal separation, thus interfering with such separation, subjecting the resulting mixture to centrifugal separation and conditioning such stratified mixture for centrifugal separation by adding sufficient water to said aqueous phase in said centrifugal to reduce the concentration thereof to such an extent that said stratification is overcome and said soap is discharged with the said aqueous phase.

6. The process as defined in claim 5 in which the concentration of said aqueous phase is reduced to between approximately 4 and 10° Bé.

7. The process of purifying vegetable and animal oils containing impurities, including free fatty acids, which comprises, mixing therewith an alkaline refining reagent capable of reacting with said impurities to precipitate the same and produce soap, said reagent being added in sufficiently high concentration to produce a stratified mixture including an oil phase, a soap phase, and an aqueous phase when the mixture is subjected to centrifugal separation, thus interfering with said separation, reducing concentration by adding an aqueous diluent to said mixture in sufficient quantity to overcome such stratification, whereby to permit said soap to be discharged with said aqueous layer, and centrifugally separating the thus conditioned mixture.

8. The process as defined in claim 7 in which the dilution produces a separation of the heavier effluent having a Baumé between approximately 4 and 10°.

9. The process as defined in claim 7 in which the dilution is effected after the soap has been at least partially separated from the oil in the centrifugal apparatus.

10. The process as defined in claim 7 in which the dilution occurs prior to complete separation in the centrifugal.

11. The process as defined in claim 7 in which the impurities separated from the oil in the centrifugal are diluted in the centrifugal after substantial separation from the oil.

12. A re-refining process for oils of low impurity content which process comprises the treatment of said oils with a caustic solution in a concentration sufficiently high to cause stratification into an oil phase, a soap phase and an aqueous phase when the mixture is subjected to centrifugal separation, introducing water to said mixture in sufficient quantity to convert the mixture from its thus stratified condition to a sufficiently non-stratified condition to permit the soapstock to be discharged with the aqueous phase, and centrifugally separating the thus conditioned mixture.

13. The process as defined in claim 12 in which the water is introduced at the point of separation in the centrifugal.

*14. The process as defined in claim 7 in which the mixture being separated is at a temperature in excess of 100° F.*

*15. The process as defined in claim 7 in which the oil is at a relatively low temperature when mixed with the refining reagent and prior to separation the temperature of the mixture is raised to that required for effective centrifugal separation.*

*16. The process as defined in claim 7 in which the amount of alkali refining reagent is between approximately ½ and 4% of the oil.*

*17. The process as defined in claim 7 in which gum content of the oil is sufficiently low to cause separation difficulties.*

*18. The process as defined in claim 7 in which the gum content of the oil is sufficiently low to cause separation difficulties, the temperature of the mixture being separated is in excess of 100° F. and sufficiently high for effective centrifugal separation and the quantity of aqueous diluent is sufficient to reduce the concentration of the excess refining reagent in the separated aqueous layer to at least 8° Baumé.*

*19. The process as defined in claim 7 in which the refining reagent has a concentration between approximately 20° and 50° Baumé.*

*20. The process as defined in claim 19 in which the quantity of aqueous diluent is sufficient to reduce the concentration of the separated aqueous layer to between approximately 4° and 10° Baumé.*

*21. The process as defined in claim 19 in which the amount of aqueous diluent is sufficient to cause the aqueous layer discharged from the centrifugal separation to be largely water.*

*22. The process of purifying vegetable and animal oils, low in gum content and containing impurities, including free fatty acids, which comprises, mixing therewith an alkaline refining reagent capable of reacting with said impurities to precipitate the same and produce soap, said reagent being added in sufficiently high concentration to produce a stratified mixture including an oil phase, soap phase, and an aqueous phase when the mixture is subjected to centrifugal separation, thus interfering with said separation, reducing concentration by adding an aqueous diluent to said mixture in sufficient quantity to overcome such stratification, said quantity of aqueous diluent reducing the concentration of the excess of alkaline reagent to at least 8° Baumé, whereby to permit said soap to be discharged with said aqueous layer, and centrifugally separating the thus conditioned mixture.*

*23. The process as defined in claim 22, in which the temperature of the conditioned mixture during centrifugal separation is in excess of 100° F.*

BENJAMIN CLAYTON.

References Cited in the file of this patent or the original patent

UNITED STATES PATENTS

| Number | Name | Date |
|---|---|---|
| 2,226,211 | Thurman | Dec. 24, 1940 |